US009588731B2

(12) United States Patent
Terai

(10) Patent No.: US 9,588,731 B2
(45) Date of Patent: Mar. 7, 2017

(54) ELECTRONIC DEVICE WITH CHANNEL ASSIGNMENT INFORMATION SUPERPOSED OVER AUDIO LEVEL METERS FOR FADERS

(75) Inventor: Shota Terai, Kanagawa-ken (JP)

(73) Assignee: TEAC CORPORATION, Tokyo (JP)

( * ) Notice: Subject to any disclaimer, the term of this patent is extended or adjusted under 35 U.S.C. 154(b) by 272 days.

(21) Appl. No.: 13/615,123

(22) Filed: Sep. 13, 2012

(65) Prior Publication Data

US 2013/0177160 A1    Jul. 11, 2013

(30) Foreign Application Priority Data

Jan. 10, 2012  (JP) .................................. 2012-001866
Jan. 12, 2012  (JP) .................................. 2012-004305

(51) Int. Cl.
*G06F 3/16*       (2006.01)
*H04R 29/00*   (2006.01)
*G11B 20/10*    (2006.01)
*G11B 27/038*  (2006.01)
*G11B 27/34*    (2006.01)

(52) U.S. Cl.
CPC ........... *G06F 3/165* (2013.01); *H04R 29/008* (2013.01); *G11B 20/10527* (2013.01); *G11B 27/038* (2013.01); *G11B 27/34* (2013.01); *G11B 2020/10592* (2013.01)

(58) Field of Classification Search
None
See application file for complete search history.

(56) References Cited

U.S. PATENT DOCUMENTS

| 6,256,027 B1 | 7/2001 | Jeong et al. |
| 2002/0015018 A1 | 2/2002 | Shimazu et al. |
| 2007/0025568 A1 | 2/2007 | Aiso et al. |
| 2010/0309153 A1 | 12/2010 | Terada |
| 2011/0231484 A1* | 9/2011 | Burgess et al. ............... 709/203 |

FOREIGN PATENT DOCUMENTS

| JP | 1-501663 A | 6/1989 |
| JP | 11-177902 A | 7/1999 |
| JP | 2002-47694 A | 2/2002 |
| JP | 2007-43249 A | 2/2007 |
| JP | 2007-329567 A | 12/2007 |
| JP | 2010232951 A | 10/2010 |
| JP | 2011239019 A | 11/2011 |

(Continued)

OTHER PUBLICATIONS

Apple Inc. GarageBand '09 Getting Started, 2009, pp. 10-28.*

(Continued)

*Primary Examiner* — Daniell L Negron
(74) *Attorney, Agent, or Firm* — Seed Intellectual Property Law Group LLP

(57) ABSTRACT

An electronic device with faders. In order to make it easy for a user to ascertain channel information assigned to each track while viewing a level meter image of the track, a level of a channel of each track is displayed as a bar graph on a display of a multitrack recorder, or the like. Further, a name of a channel assigned to each track is displayed, as assignment information about the track, in a superposed manner at a lower end of a corresponding bar graph.

12 Claims, 4 Drawing Sheets

(56) References Cited

FOREIGN PATENT DOCUMENTS

WO 88/02958 A1 4/1988

OTHER PUBLICATIONS

Korg, INC. "Slim-Line USB Controller nanoKONTROL2", entire document.*
Yamaha, PM5D Digital Mixing Console PM5D/PM5D-RH Owner's Manual, 2004, pp. 14-16, 19, 20, 26, 110, and 111.*
Japanese Office Action with English Translation, issued Jan. 19, 2016 for corresponding JP Application No. 2012-004305, 5 pages.

* cited by examiner

ELECTRONIC DEVICE WITH CHANNEL ASSIGNMENT INFORMATION SUPERPOSED OVER AUDIO LEVEL METERS FOR FADERS

PRIORITY INFORMATION

This application claims priorities to Japanese Patent Application Nos. 2012-001866, filed on Jan. 10, 2012, and 2012-004305, filed on Jan. 12, 2012, which are incorporated herein by reference in their entireties.

BACKGROUND OF THE INVENTION

Technical Field

The present invention relates to an electronic device, like a multitrack recorder and a mixer, and more particularly to a technique for displaying information about assignment of a channel to each of a plurality of tracks (multiple tracks).

Related Art

A multitrack recorder records each of audio signals of a plurality of channels by assigning the audio signal to at least one of a plurality of tracks. In order to ascertain information about assignments of signals to respective tracks (i.e., assignment information), a display, like a liquid crystal display, is switched to a specific screen, to thus display the information. For instance, when there are eight channels from A to H; when the channel A is assigned to track 1; and when the channel B is assigned to track 2, a user switches a mode of a liquid crystal display to display assignment information, such as A-track 1 and B-track 2, thereby ascertaining the assignment information.

Meanwhile, there is also a known technique for displaying on a display a level of an audio signal of each track in the form of a level meter image. The level of the audio signal of each of the tracks can be controlled by operating a fader provided in correspondence to each of the tracks. A level of an audio signal that changes in response to a position of an operated fader is displayed as a bar graph (a level meter) having a length substantially proportional to the magnitude of the level.

JP 2010-232951 A and JP 2011-239019 A disclose displaying a fader position marker of each channel and a fader position marker of each channel in scene data, in a superposed manner, on a level meter image and also displaying a color indicator of each of the channels below the level meter image.

As mentioned in connection with the related art, displaying the fader position marker of each of the channels on the level meter image is effective. However, quite a lot of users desire to ascertain assignment statuses of the respective tracks while viewing corresponding level meter images. For instance, when there is a drum in one channel, the user sometimes wants to ascertain, as occasion requires, which track is assigned to the drum and whether or not a level of the track is appropriate while visually ascertaining the level meter image. In such a case, an existing configuration in which assignment information is displayed by means of switching the level meter image cannot meet the user's request, which raises a problem of deterioration of ease of operation.

SUMMARY

The present invention provides an electronic device with faders that enable a user to ascertain channel information assigned to each of tracks easily while viewing a level meter image of each track, thereby enhancing ease of operation.

The present invention is directed toward an electronic device with faders comprising:

assigning means for assigning each of audio signals of a plurality of channels to at least one of a plurality of tracks; and display means for displaying for each track a level of the audio signal of the channel assigned to the track as level meter images along with information about the track and displaying assignment information about the channel assigned to the track in color differing from that of the level meter image in a superposed manner at a track-information-side end of the level meter image.

One embodiment of the present invention is characterized in that the track information is a track number;

the level meter image includes a bar graph extending in a longitudinal direction in correspondence with the track number; and the assignment information is displayed at a lower end of the bar graph in a vicinity of the track number.

Another embodiment of the present invention is characterized in that the assignment information is a name of a channel assigned to the track and displayed in color that is identical with that of the track number but different from that of the bar graph.

According to the invention, assignment information is displayed in a superposed manner on a level meter image, so that the user can readily ascertain information about channels assigned to respective tracks while viewing a level screen. Accordingly, the user becomes unnecessary to perform operation for switching level meter images in each case in order to ascertain assignment information, so that ease of operation is enhanced.

The invention will be more clearly comprehended by reference to the embodiments provided below. However, the embodiments are illustrative, and the invention is not limited to the following embodiments.

BRIEF DESCRIPTION OF THE DRAWINGS

Preferred embodiments of the present invention will be described in detail by reference to the following drawings, wherein.

DETAILED DESCRIPTION

By reference to the drawings, embodiments of the present invention are hereunder described by taking a multitrack recorder as an example electronic device with faders. The invention, however, can be applied to equipment other than the multitrack recorder.

Figure 1:
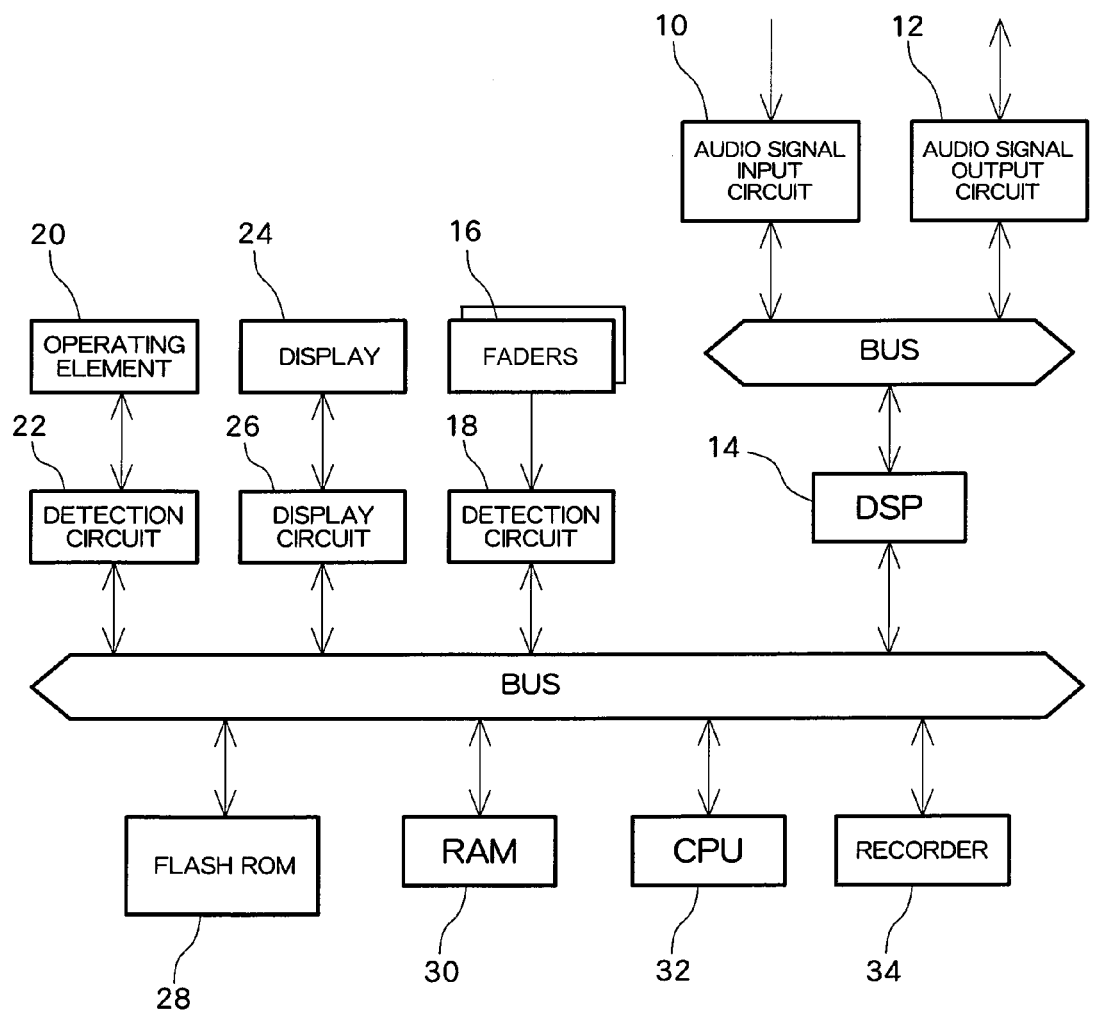
FIG. 1 is a block diagram of a multitrack recorder of an embodiment.

FIG. 1 is a block diagram of a multitrack recorder of the embodiment. An audio signal input circuit 10 has a plurality of input ports and inputs an audio signal from a plurality of sound sources (sources). The plurality of audio signals are exemplified by audio signals of a guitar, vocals, a drum, and so on. In the embodiment, the audio signal input circuit 10 has eight input ports A to H and inputs audio signals by way of the respective input ports. The input ports A to H are hereinbelow referred to as channels A to H. The audio signals input from the audio signal input circuit 10 are fed to a DSP (Digital Signal Processor) 14 by way of a bus.

Under control of a CPU 32, the DSP 14 subjects the audio signals of the plurality of channels fed from the audio signal input circuit 10 to various types of digital processing; for instance, effect processing, equalizing, and mixing, and records processing results in a recorder 34 by way of the bus. A recording medium of the recorder 34 is an optical disk, such as a CD-R/RW disk and a DVD-R/RW disk, a hard disk drive, a flash memory medium, and the like. Processing performed by the DSP 14 includes processing for controlling sound levels of the respective audio signals according to operation positions of faders to be described later.

The faders 16 are disposed on an operating panel of the multitrack recorder in correspondence with a plurality of tracks, respectively. The faders are provided in a one-to-one correspondence with the plurality of tracks, respectively. However, they can also be provided for a plurality of tracks; namely, two tracks or more, in a many-to-one correspondence. A detecting circuit 18 detects operation positions of the respective faders 16. The detecting circuit 18 supplies the CPU 32 with operation position detection signals pertaining to the faders 16, by way of the bus.

Operating elements 20 are disposed on the operating panel of the multitrack recorder. The operating elements 20 are comprised of various key switches, selection buttons, menu buttons, decision buttons, and the like. The user assigns each of the audio signals of the plurality of channels to at least one of the plurality of tracks by operating any of the operating elements 20. A detection circuit 22 detects operation statuses of the respective operating elements 20. The detection circuit 22 supplies the CPU 32 with an operation status detection signal pertaining to the operating elements 20 by way of the bus.

The CPU 32 controls the entirety of the multitrack recorder in an integrated fashion. The CPU 32 performs various types of processing operations by using RAM 30 as working memory according to a program stored in flash ROM 28. Specifically, according to the operation status detection signal from the detection circuit 22, the CPU 32 assigns each of the audio signals of the plurality of channels to at least any one of the plurality of tracks. For instance, when there are tracks 1 through 24, channel A is assigned to the track 1; channel B is assigned to the track 2; and channel C is assigned to the track 10. In the embodiment, correspondence between each channel and each track, which is determined as a result of assignment of the channel to the track, is referred to as "assignment information." The CPU 32 supplies a display circuit 26 with various types of information. The display circuit 26 displays the information on a display 24. According to a fader operation position detection signal from the detection circuit 18, the CPU 32 commands the display circuit 26 to display levels of the channels assigned to the respective tracks in a bar graph format (a level meter). The display circuit 26 displays the level meter image on the display section 24 according to the information from the CPU 32. The CPU 32 commands the display circuit 26 to display assignment information on the display 24 such that the information is superposed on the level meter images displayed on the display 24. The CPU 32 reads audio signals recorded in the recorder 34 according to the operation status detection signal from the detection circuit 22 and supplies the thus-read audio signals to the DSP 14. The DSP 14 outputs the audio signals to the outside by way of the bus and an audio signal output circuit 12. The audio signal output circuit 12 has various output ports, such as an analogue output port and a digital output port.

Figure 2:
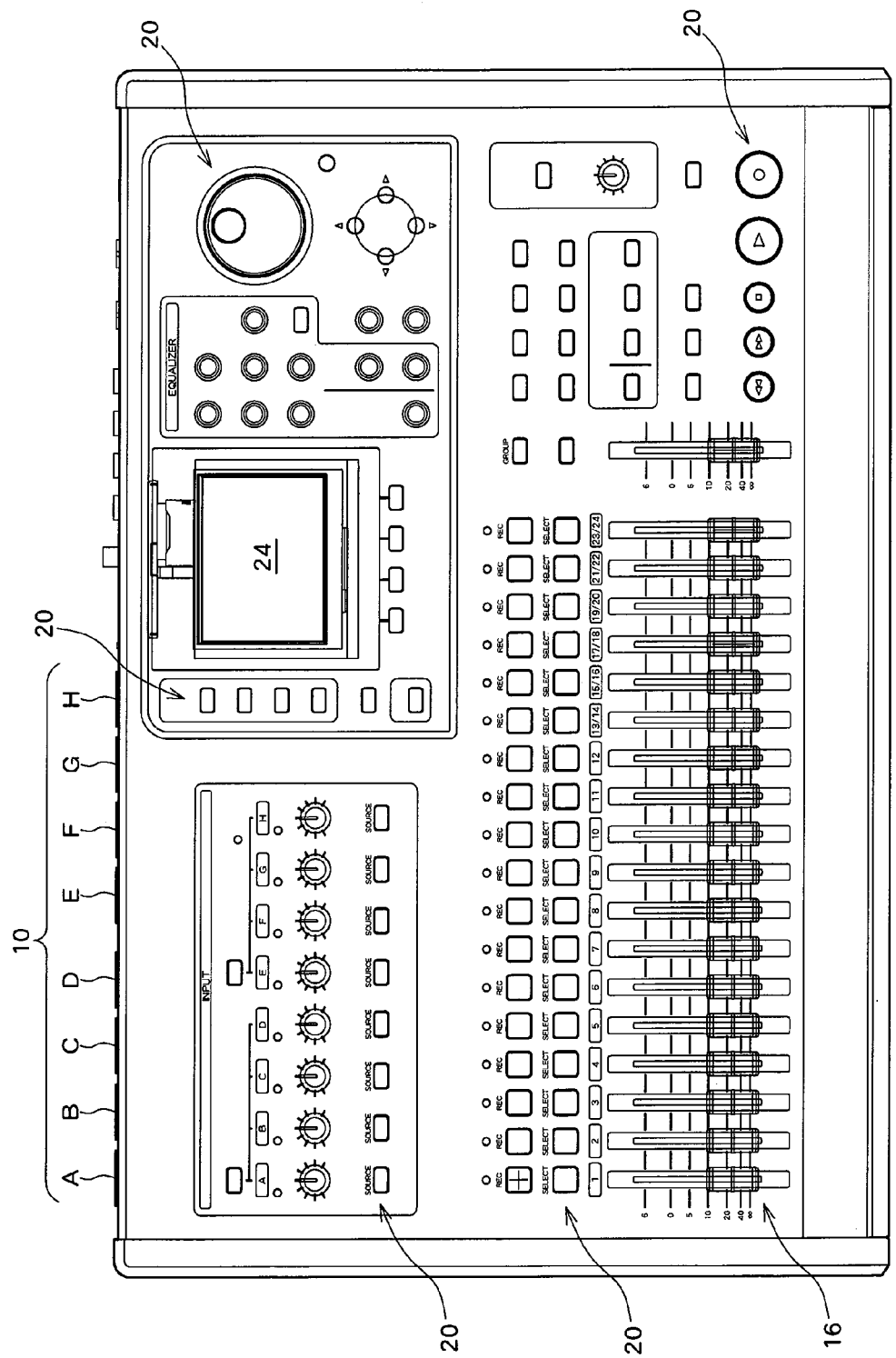
FIG. 2 is a plan view of the multitrack recorder.
Figure 3:
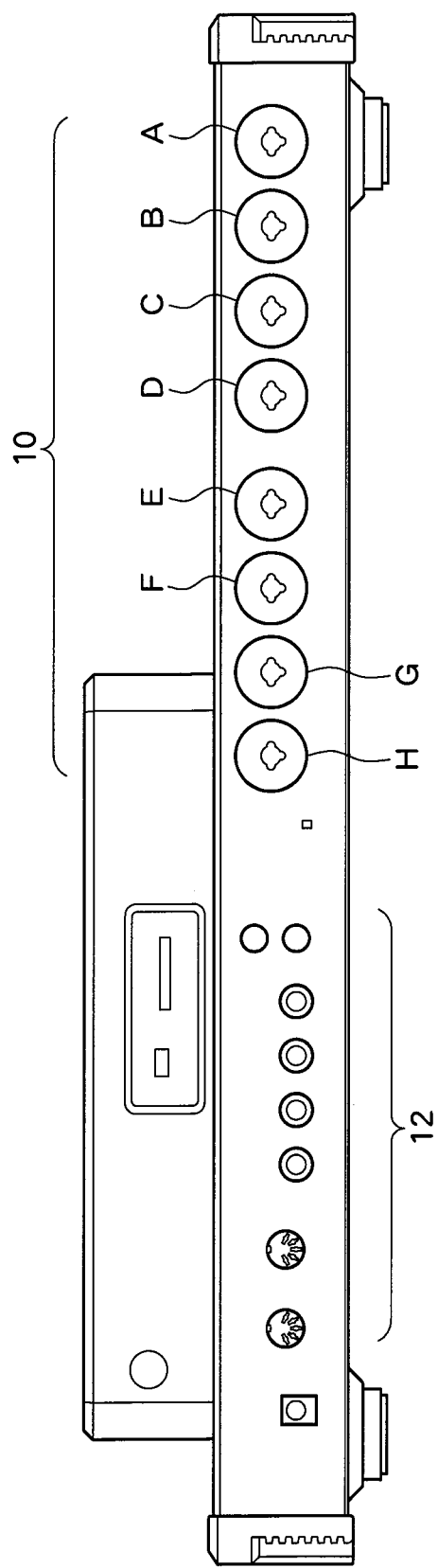
FIG. 3 is a rear view of the multitrack recorder.

FIG. 2 shows a plan view of the multitrack recorder of the embodiment. FIG. 3 shows a rear view of the multitrack recorder.

The various types of operating elements 20, the faders 16, and the display 24 are provided on the operating panel of the multitrack recorder. The input ports 10A to 10H and the output ports 12 are provided on a rear surface of the multitrack recorder. In addition to including selection switches and a jog dial for assigning the audio signals of the channels A to H to any of the tracks 1 through 24, and arrow keys, the operating elements 20 include operating switches, or the like, for commanding recording, playback, stopping, fast-forwarding, and rewinding of audio signals recoded in the recorder 34. When assigning the audio signal of each of the channels A to H to any of the tracks 1 through 24, the user first selects desired tracks to be assigned by operating the selection buttons provided for the faders 16 of the respective tracks and operates a desired one of the selection buttons provided for the respective channels A to H, thereby selecting a channel to be assigned to the track. Alternatively, the user can also select and assign a channel and a track by operating the jog dial and the arrow keys. As a matter of course, the method for assigning the channels to the respective tracks is not limited to that mentioned above, and an arbitrary means can be used. Arbitrary means can be adopted instead, so long as they have a function of selecting a desired channel from a plurality of channels, another function of selecting a desired track from a plurality of tracks, and yet another function of correlating the thus-selected channel and the thus-selected track with each other. Assignment information; for instance, Channel A (guitar audio signal)—Track 1
Channel B (drum)—Track 2
Channel C (soprano vocal)—Track 3
Channel D (tenor vocal)—Track 4, is generated and stored in the RAM 30. In the embodiment, the operating elements 20, the detection circuit 22, and the CPU 32 work as assignment means.

The fader 16 is provided for each of the tracks. In the embodiment, in consideration of miniaturization of the multitrack recorder, the fader 16 is provided for each of the tracks 1 through 12. However, one fader 16 is provided commonly for two tracks from tracks 13 to 24. Namely, one fader 16 is provided for the tracks 13 and 14; another one fader 16 is provided for the tracks 15 and 16; and so on. When the user has operated the fader 16 for the track 1, the detection circuit 18 detects an operation position of the fader 16 and feeds the thus-detected position to the CPU 32. The CPU 32 commands the DSP 14 to control, increasingly or decreasingly, a level of an audio signal of the channel assigned to the track 1 (i.e., the channel A in the above case) on the basis of the operation position detection signal and the assignment information stored in the RAM 30 and in accordance with an operation position of the fader 16. Pursuant to the command from the CPU 32, the DSP 14 controls, increasingly or decreasingly, the level of the audio signal of the corresponding channel.

A display 24 is disposed at a substantially upper center area of the operating panel of the multitrack recorder. The display 24 is constituted of a liquid crystal display, an organic EL display, or the like. A level of an audio signal assigned to a track (i.e., a level commensurate with the operation position of the fader 16) is displayed as a level meter image for each of the tracks on the display 24. Moreover, assignment information is displayed in a superposed manner at a predetermined position of each of the level meter images.

Figure 4:
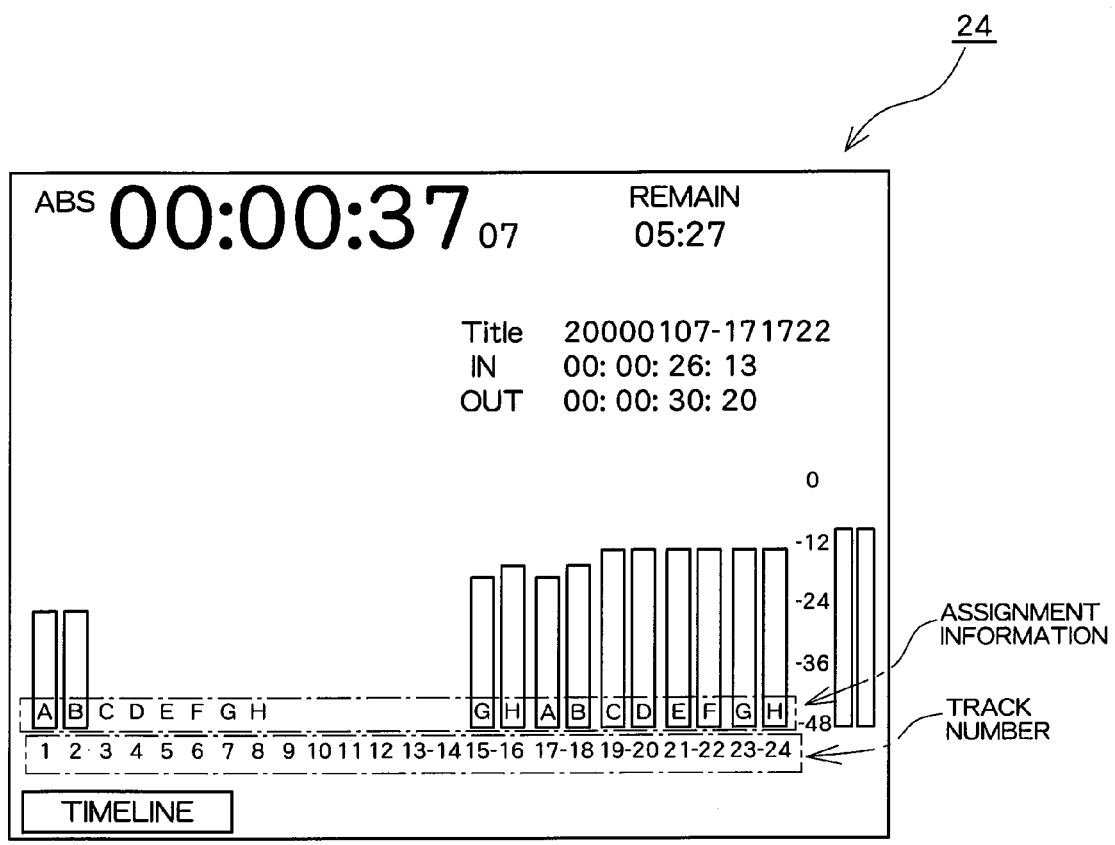
FIG. 4 is a display screen view of the multitrack recorder.

FIG. 4 shows a display screen of the display 24 shown in FIG. 2. Levels of audio signals are displayed on a per-track basis in the form of bar graphs in addition to various time information (an elapsed time and a remaining time) and a song title. Specifically, track numbers 1 through 24 are displayed in a horizontal row in a lower portion of the display 24, and levels of audio signals assigned to the respective tracks are displayed as bar graphs in the vertical direction in correspondence with the respective track numbers. The track numbers and the bar graphs are displayed in predetermined colors, respectively. For instance, the track numbers are displayed in white, and the bar graphs are displayed in blue. Further, names of the channels assigned to in a superposed manner the bar graphs are displayed as assignment information at lower ends of the respective bar graphs; namely, track number sides of the bar graphs, respectively. Since the track 1 is assigned the channel A, reference symbol "A" representing the channel A is displayed in a superposed manner at the lower end of the bar graph of the track 1. Furthermore, since the track 2 is assigned the channel B, reference symbol "B" representing the channel B is displayed in a superposed manner at the lower end of the bar graph of the track 2. Although the channel C is assigned to the track 3, the bar graph is not displayed because the level of an audio signal of the channel C is zero. Only reference symbol "C" representing the channel C is displayed at a position corresponding to a lower end of a bar graph on condition that the bar graph is displayed. The same also applies to any counterparts in the following descriptions. Since the track 15 is assigned the channel G, reference symbol "G" representing the channel G is displayed at a lower end of a bar graph of the track 15. Since the channel H is assigned to the track 16, reference symbol "H" representing the channel H is displayed in a superposed manner at a lower end of a bar graph of the track 16. Since channels are not assigned to the tracks 9 through 14, names of the channels are not displayed.

When the user has changed assignment information by operating any of the operating elements 20, it is needless to say that corresponding assignment information in the display 24 is changed accordingly. For instance, supposing that the user has assigned not the channel A but the channel G to the track 1 by operating any of the operating elements 20, the thus-changed assignment information is fed as an operation status detection signal from the detection circuit 22 to the CPU 32. The CPU 32 rewrites the assignment information stored in the RAM 30 by use of the detection signal. On the basis of the thus-rewritten assignment information, the assignment information about the track 1 displayed on the display 24 is displayed after having been changed from "A" to "G."

Since the assignment information is displayed in a superposed manner on the level meter image; namely, the bar graph, it is desirable to display assignment information in a color differing from that of the bar graph. For instance, when the bar graphs are displayed in blue, the assignment information is displayed in white. Displaying the truck numbers in the same color as that of the assignment information is more desirable. If the assignment information and the track numbers are displayed in the same color, the user can visually ascertain the assignment information and the track numbers while correlating them with each other. Hence, the user can ascertain at first glance which channel is assigned to which track.

FIG. 4 shows bar graphs in the vertical direction as level meter images. However, the track numbers may also be displayed in a vertical column, whilst the bar graphs for the respective tracks may also be displayed in a horizontal direction (i.e., in the form of bars stretched in the right direction). In this case, the assignment information about each track is displayed in a superposed manner on a left end of each bar graph. In short, all you have to do is to display assignment information in a superposed manner on a track-number-side end of each bar graph.

In the embodiment, the assignment information is displayed in a superposed manner at the track-number-side ends of the respective bar graphs. However, the assignment information, in addition to being displayed at the position mentioned above, can also be displayed at another position; for instance, an upper portion or an upper end of the bar graph or a lower portion of the track number. When the assignment information is displayed at an upper portion or an upper end of the bar graph, the assignment information and the bar graph can be recognized while correlated with each other because they are closely positioned. However, the all-important track number and the assignment information become separated from each other. Further, when the assignment information is displayed below the track number, correlating the assignment information with the track number is easy, but a line of sight is diverted away from the bar graphs. The user basically desires to ascertain whether or not the levels of respective tracks are at desired levels by viewing the level meters. For this reason, displaying the assignment information at positions where the line of sight is to be diverted away from the level meters is not preferable. Moreover, in order to display the assignment information below the track numbers, it is necessary to assure a space for displaying the assignment information. This poses difficulty in miniaturizing the display 24 and, by extension, miniaturizing the multitrack recorder. For these reasons, displaying the assignment information at the ends of the respective bar graphs in a superposed manner can be said to be desirable.

Incidentally, JP 2010-232951 A discloses displaying color indicators of respective channels below respective level meter images. In addition to encountering the foregoing problem, the technique encounters another problem of the inability to display the color indicators in a superposed manner on the bar graphs because the channels are distinguished from each other by colors. Superiority of the embodiment over the related art is consequently obvious.

As above, in the embodiment, the assignment information about each of the tracks is displayed in a superposed manner on the level meter images, the user does not need to switch a screen of the display 24 in each case in order to ascertain assignment information. Further, the user can ascertain assignment information about each track; namely, assignment of a channel to each track, while viewing the level meter image and ascertaining the level of each track. Hence, ease of operation of the multitrack recorder is enhanced to a much greater extent.

In the embodiment, which one of input channels is assigned to each track is taken as assignment information. In addition to this, which one of output channels is assigned to each track may be taken also as assignment information. Specifically, when there are a plurality of output channels and when the respective output channels can be assigned to desired tracks, the output channels are assigned to the respective tracks by operating any of the operating elements 20, and the thus-assigned output channels are stored in the RAM 30. At the time of output operation, the CPU 32 displays, as assignment information, a name of the output channel assigned to each track in a superposed manner on the level meter image of the track.

Although all of the existing tracks 1 through 24 are displayed on the display 24 in the embodiment, there can also be adopted a configuration that switches, as appropriate, between the display of the tracks 1 through 12 and the display of the tracks 13 through 24 in order to miniaturize the operating panel. For instance, when only 12 faders are available for the tracks 1 through 24, there is adopted a configuration in which one fader is shared between the track 1 and the track 13 and where another fader is shared between the track 2 and the track 14. The multitrack recorder displays, by default, the level meter images of the tracks 1 through 12 and the assignment information on the display 24. The level meter images of the tracks 13 through 24 and the assignment information are displayed on the display 24 by operating any of the operating elements 20 to switch the screen. The tracks are not limited to the tracks 1 through 12, and an arbitrary number of tracks can be displayed. For instance, level meter images of the tracks 1 through 6 and the assignment information are displayed.

In addition to assigning the respective channels to tracks in one-to-one correspondence, each of the channels can also be assigned to a plurality of tracks in the embodiment. For instance, the channel A is assigned to the track 1 and the track 17. Each of the channels can be assigned to at least one of the plurality of tracks.

In the embodiment, the assignment information is displayed in a superposed manner on the level meter images. However, there can also be adopted a configuration in which the bar graphs are deleted by user's operation of any of the operating elements 20, to thus display only the track numbers and corresponding assignment information. Specifically, in FIG. 4, only the display of the bar graphs is deleted by user's operation of a specific button of the operating elements 20 while the track numbers and the assignment information are left as they are. Thereby, for instance, even when the assignment information displayed in a superposed manner on the bar graphs is hard to view, the assignment information can be immediately ascertained by deleting only the bar graphs. A desirable configuration in this case is to display the bar graphs again by means of second operation of the specific button of the operating elements 20.

Furthermore, the name of the channel assigned to the track is taken as the assignment information in the embodiment. However, an arbitrary sign can be used, so long as the sign enables distinction of the channel. For example, when the channel A is assigned to a guitar audio signal, the word "Guitar" or an icon depicting a guitar is displayed in lieu of "A" as assignment information. When the channel B is assigned to a drum audio signal, the word "Drum" or an icon depicting a drum is displayed as assignment information in place of "B."

Although the embodiments have been described by means of taking, by way of example, the multitrack recorder, the present invention can also be applied to an electronic device with faders; for instance, a mixer.

What is claimed is:

1. An electronic device, comprising:
   an operating panel;
   an audio signal input circuit having a plurality of input ports;
   an assigning unit configured to assign each of audio signals input through the plurality of input ports to at least one of a plurality of tracks;
   a plurality of faders that are physically disposed on the operating panel, the plurality of faders being configured to control a corresponding one of audio signal levels of the plurality of tracks; and
   a display that is physically disposed on the operating panel;
   a processor coupled to the display, the processor being configured to cause the display to display a display screen including a plurality of audio level meters, assignment information including an identifier of an input port, and track information for each track, the plurality of audio level meters being configured to indicate a corresponding one of the audio signal levels of the plurality of tracks, the assignment information including an identifier of an input port being displayed superposed over a bar graph included in an audio level meter corresponding to a track to which the input port is assigned, the assignment information being displayed in a color different from a color in which the bar graph is displayed, and the track information being displayed adjacent to a bar graph of an audio level meter for each track over which the assignment information is displayed in a superposed manner.

2. The electronic device according to claim 1, wherein the assignment information includes names of input ports and the track information includes track numbers.

3. The electronic device according to claim 1, wherein the plurality of input ports are assigned to the plurality of tracks by a user through the operating panel.

4. The electronic device according to claim 1, wherein the assignment information is customized by a user through the operating panel.

5. The electronic device according to claim 1, wherein the processor is configured to cause the display to display an identifier of an input port without a bar graph of a corresponding audio level meter while a level of an audio signal of a track to which the input port is assigned is zero.

6. The electronic device according to claim 1, wherein the processor is configured to cause the display to remove the plurality of audio level meters from the display.

7. An electronic device, comprising:
   an operating panel;
   an audio signal output circuit having a plurality of output ports;
   an assigning unit configured to assign each of audio signals recorded in a plurality of tracks to at least one of the plurality of output ports;
   a plurality of faders that are physically disposed on the operating panel, the plurality of faders being configured to control a corresponding one of audio signal levels of the plurality of tracks; and
   a display that is physically disposed on the operating panel;
   a processor coupled to the display, the processor being configured to cause the display to display a display screen including a plurality of audio level meters, assignment information including an identifier of an output port, and track information for each track, the plurality of audio level meters being configured to indicate a corresponding one of the audio signal levels of the plurality of tracks, the assignment information including an identifier of an output port being displayed superposed over a bar graph included in an audio level meter corresponding to a track to which the output port is assigned, the assignment information being displayed in a color different from a color in which the bar graph is displayed, and the track information being displayed adjacent to a bar graph of an audio level meter for each track over which the assignment information is displayed in a superposed manner.

8. The electronic device according to claim 7, wherein the assignment information includes names of output ports and the track information includes track numbers.

9. The electronic device according to claim 7, wherein the plurality of output ports are assigned to the plurality of tracks by a user through the operating panel.

10. The electronic device according to claim 7, wherein the assignment information is customized by a user through the operating panel.

11. The electronic device according to claim 7, wherein the processor is configured to cause the display to display an identifier of an output port without a bar graph of a corresponding audio level meter while a level of an audio signal of a track to which the output port is assigned is zero.

12. The electronic device according to claim 7, wherein the processor is configured to cause the display to remove the plurality of audio level meters from the display.

* * * * *